No. 12,075. REISSUED JAN. 27, 1903.

O. MARTH.

FRICTION GEARING.

APPLICATION FILED OCT. 20, 1902.

Witnesses

Hermann Wunderlich

Josef Rohrscka

Inventor

Oscar Marth per Anton von Herr

Attorney.

UNITED STATES PATENT OFFICE.

OSCAR MARTH, OF ALSO LIESZKO, AUSTRIA-HUNGARY

FRICTION-GEARING.

SPECIFICATION forming part of Reissued Letters Patent No. 12,075, dated January 27, 1903.

Original No. 705,108, dated July 22, 1902. Application for reissue filed October 20, 1902. Serial No. 128,036.

*To all whom it may concern:*

Be it known that I, OSCAR MARTH, a subject of the Emperor of Germany, residing at Also Lieszko, in the county of Trencsin and Empire of Austria-Hungary, have invented new and useful Improvements in Friction-Gearing, of which the following is a specification.

My invention relates to that class of gearing in which one of two shafts arranged in line with each other carries an annular friction-wheel and the other an ordinary friction-wheel of smaller diameter, motion being transmitted by means of intermediate rollers adapted to engage both friction-wheels.

The invention has for its purpose to provide a friction-gearing of this class in which so much friction can be created that it is adapted for the transmission of considerable amounts of power and which can be thrown into and out of gear at will.

According to my invention leverage is utilized for creating between the surfaces of contact the considerable intensity of pressure which yields the amount of friction required for the transmission of high powers. In order to admit of this, I arrange the annular friction-wheel and disk-shaped friction-wheel in different planes, make up the intermediate rollers into revoluble levers, and provide means for exerting radial pressure upon the power-arms of the said revoluble levers. These levers may be looked upon as shafts journaled in radial slots of a frame secured against turning and each carrying two cylindric bodies in contact with the working surfaces of the annular and solid friction-wheels, respectively, extensions of the said shafts beyond either cylindric body being the power-arms of the levers, upon which I exert pressure in radial directions by means of wedging freely-revoluble solids of revolution. When it is desired to provide for throwing into and out of gear, I make the power-arms conical and adapt either the frame in which the revoluble levers are journaled or the wedging solid of revolution for endwise displacement.

Figure 1:
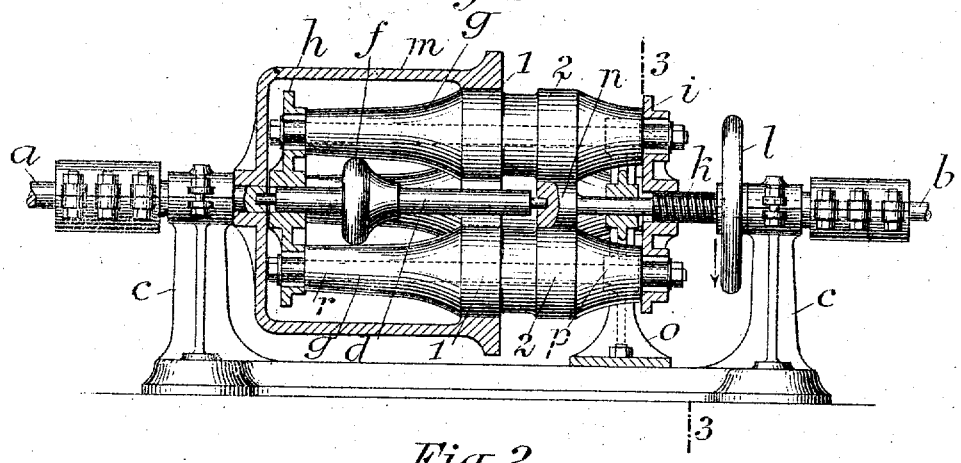
Figure 2:
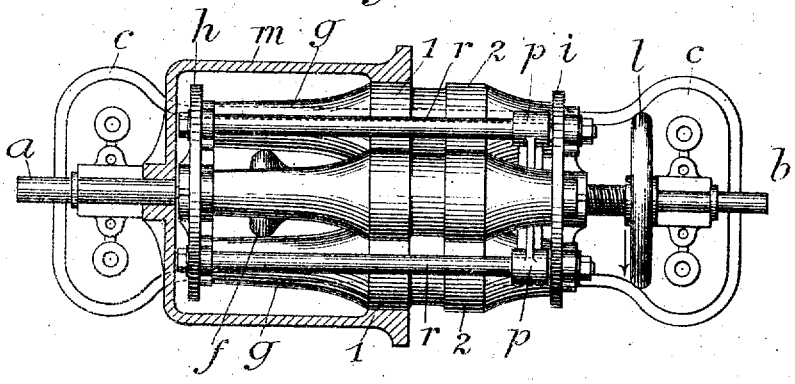
Figure 3:
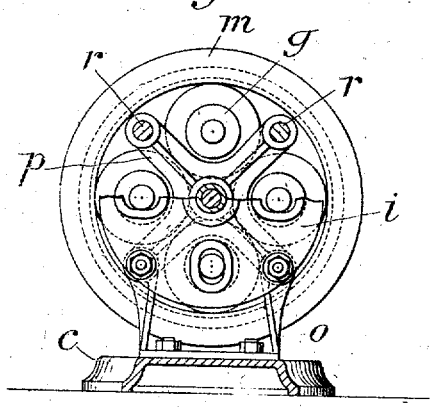

In the annexed sheet of drawings, Figure 1 is a sectional side elevation of a friction-gearing of the kind referred to and adapted for being thrown into and out of gear. Fig. 2 is a sectional plan of the gearing, and Fig. 3 is a partly-sectional end view of the same.

Referring to the drawings, *a* and *b* are the shafts in line with each other, and from one of which motion and power is to be transmitted to the other in such a manner that the shaft *a* revolves in a given ratio more slowly than the shaft *b*. The shafts *a* and *b* have their bearings formed in the standards *c*, carried by a common bed-plate, and in the ends of the said shaft are formed the bearings of a shaft *d*, which carries a globular or spheroidal roller *f*. The said spheroidal roller *f* does the office of the wedging solid of revolution referred to above and is intended to exert pressure in radial direction upon the conical power-arms of the revoluble levers *g*, the trunnions of which are journaled in slots of two shields *h* and *i*. The shield *h* is loosely mounted upon the shaft *d*, and the shield *i* has its threaded central hole engaged by a tubular screw *k*, loosely mounted upon the shaft *b* and carrying a hand-wheel *l*. The standard *o*, which is secured to the bed-plate between the shields *h* and *i*, is made integral with a cross-shaped shield *p*, through the eyes of which pass rods *r*, which connect the two shields *h* and *i* with each other. It will be seen that thus the frame formed by the two shields *h* and *i* and the rods *r* is adapted to be moved endwise, but prevented from being rotated around the shafts *b* and *d*.

When the aforesaid hand-wheel *l* is rotated in the direction of the arrow, the frame in which the revoluble levers *g* are journaled is pushed toward the shaft *a*, and thereby the conical power-arms of the revoluble levers *g* are caused to slide upon the spheroidal roller *f* with a wedging effect, and strong radial pressure is exerted on them. At the same time the cylindric working surfaces 1 of the revoluble levers *g* are caused to enter the annular friction-wheel *m*, keyed to the shaft *a*, and other cylindric working surfaces 2 of the said revoluble levers are brought into contact with the circumference of the disk-shaped friction-wheel *n*, keyed to the shaft *b*. As the annular friction-wheel *m* and the solid friction-wheel *n* are arranged a certain distance apart and as the conical power-arms of the revoluble levers *g* are of a suitable length, considerable leverage takes place when the said conical power-arms are forced upon the spheroidal roller *f*. The cylindric working surfaces 1 and 2 of the revoluble levers *g* fit snugly into the annular wheel *m* and around the disk-shaped wheel *n*, respectively, and in consequence of the explained leverage they are pressed with considerable force against the friction-wheels. The considerable amount of friction thus created enables this gearing to transmit great amounts of power.

It will be readily understood that instead of arranging the solid friction-wheel outside the annular one it may be arranged inside the same, when the position of the revoluble levers would be reversed—that is to say, their power-arms would be directed toward the shaft *b*. It is also obvious that instead of an endwise-movable bearing-frame for the revoluble levers *g* and a spheroidal roller *f*, secured against endwise displacement, the reverse arrangement may be used—that is to say, revoluble levers *g*, journaled in a fixed frame, and a spheroidal roller *f*, adapted to be moved endwise for being engaged with or disengaged from the conical power-arms of the revoluble levers *g*.

What I claim, and desire to secure by Letters Patent of the United States, is—

1. In a friction-gearing, the combination with the two shafts arranged in a line, of an annular friction-wheel secured to the shaft which is to revolve slower, a solid friction-wheel secured to the other shaft and located outside the plane of the annular wheel, a bearing-frame loosely surrounding the line of shafting and secured against turning, a number of revoluble levers journaled in the said frame and each provided with two cylindric portions in contact with the working surfaces of the annular and solid friction-wheels, respectively, and means for exerting radial pressure upon the power-arms of the said revoluble levers, substantially as and for the purpose described.

2. In a friction-gearing, the combination with the two shafts arranged in a line, of an annular friction-wheel secured to one shaft, a solid friction-wheel secured to the other shaft, without the plane of the annular wheel, a spheroidal roller journaled in the ends of the two shafts, a frame loosely surrounding the shafts, means for preventing the said frame from turning around the shafts, and a number of revoluble levers journaled in the said frame, each lever being provided with two cylindric portions in contact with the working surfaces of the annular and solid friction-wheels, respectively, and having its conical power-arm extending toward and beyond the spheroidal roller, and one of the two parts—frame or spheroidal roller—being endwise movable, substantially as and for the purpose described.

3. In a friction-gearing, the combination with the two shafts arranged in a line, of an annular friction-wheel secured to one shaft, a solid friction-wheel secured to the other shaft, without the plane of the annular wheel, a spheroidal roller journaled in the ends of the two shafts, a frame in the shape of a lantern-wheel loosely mounted to the line of shafting and adapted to move endwise, means for preventing said frame from revolving, a tubular screw loosely mounted upon the shaft carrying the solid friction-wheel and engaging a tapped hole of the lantern-wheel-shaped frame, means for turning this screw in either direction, and a number of revoluble levers journaled in the said frame, each lever being provided with two cylindric portions in contact with the working surfaces of the annular and solid friction-wheels, respectively, and having its conical power-arm extending toward and beyond the spheroidal roller, substantially as and for the purpose described.

In witness whereof I have signed this specification in presence of two witnesses.

OSCAR MARTII.

Witnesses:

HERMANN WUNDERLICH.

ALVESTO S. HOGUE.